United States Patent Office 3,657,218
Patented Apr. 18, 1972

3,657,218
DISAZO DYES HAVING A β-(-p-HYDROXY-PHENYL)-PROPIONIC ACID OR A DERIVATIVE THEREOF AS THE COUPLING COMPONENT
Gerhard Gnad, Ludwigshafen, Germany, assignor to Badische Anilin- & Soda-Fabrik Aktiengesellschaft, Ludwigshafen (Rhine), Germany
No Drawing. Filed Oct. 7, 1969, Ser. No. 864,532
Claims priority, application Germany, Oct. 19, 1968, P 18 04 070.5
Int. Cl. C09b 35/14; D06p 1/06
U.S. Cl. 260—175       4 Claims

ABSTRACT OF THE DISCLOSURE

Disazo dyes having a β-(p-hydroxyphenyl)-propionic acid or a derivative thereof as the coupling component; they are useful for dyeing synthetic polyamides or polyesters as fibers and textile materials to give dyeings fast to light and wet treatments and to high temperature, particularly those dyes of the formula:

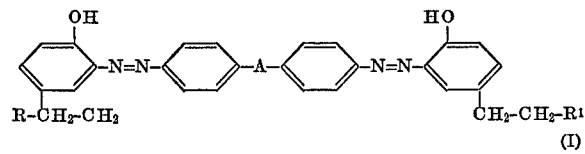

(I)

where R and $R^1$ may be identical or different and each denotes a cyano, carboxyl, carbalkoxy, unsubstituted amide or substituted amide group and —A— denotes a direct bond, an oxygen atom, a sulfur atom, or one of the following bridging groups:

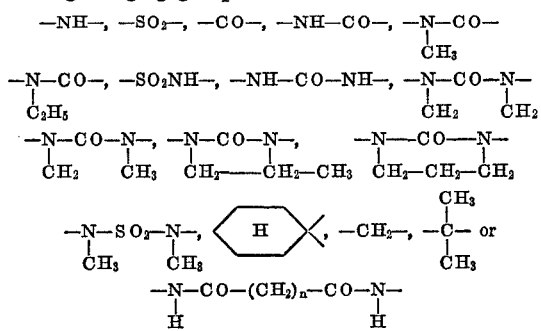

$n$ denoting zero or one of the integers 1 to 6.

Examples of carbalkoxy or substituted amido radicals for R and $R^1$ are: carbomethoxy, carboethoxy, carbopropoxy, carbobutoxy, N-methylcarbamoyl, N,N-dimethylcarbamoyl, N-ethylcarbamoyl, N,N-diethylcarbamoyl, N-butylcarbamoyl, N-(γ-methoxypropyl)-amide or radicals having the formula

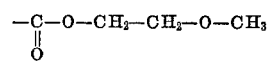

or

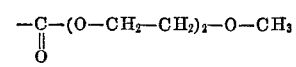

Preferred radicals R and $R^1$ are cyano, carboxyl, carbomethoxy, carboethoxy, carbopropoxy, carbobutoxy or carbamoyl.
Preferred groups for A are the radicals having the formula —S—, —O—,

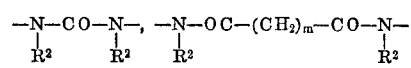

or

where $m$ denotes one of the integers 0 to 6 and $R^2$ denotes a hydrogen atom or a methyl or ethyl group. Of these groups A, —S—, —O—,

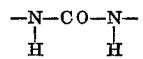

and

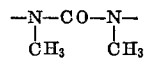

are preferred.
Examples of industrially preferred dyes having the Formula I are the compounds having the formula:

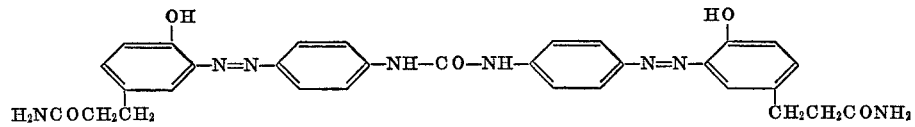

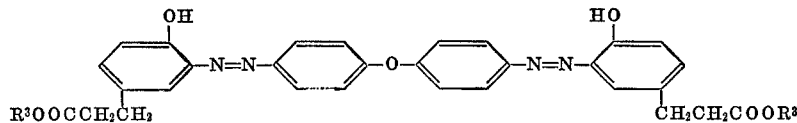

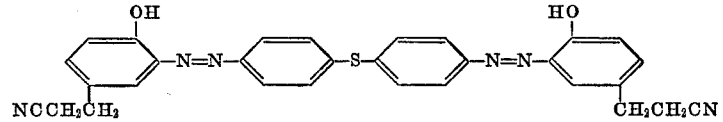

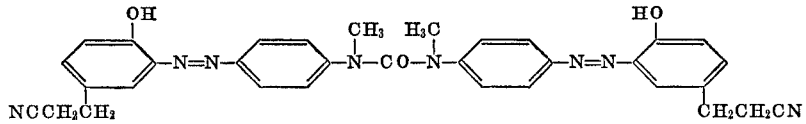

where $R^3$ denotes an alkyl radical having from one to four carbon atoms or a radical having the formula: $-CH_2CH_2OCH_3$ or $-(OCH_2CH_2)_2OCH_3$.

The new dyes are suitable for dyeing cellulose esters or polyesters and polyamides. Very fast dyeings are obtained particularly on polyesters and synthetic polyamides, the fastness to light, wet treatments and high temperature being noteworthy. The material to be dyed is preferably fibers and textile material such as woven, nonwoven and knitted fabric, filaments and threads.

The dye having the Formula I may be prepared for example by reacting tetrazo compounds of diamines having the general Formula II:

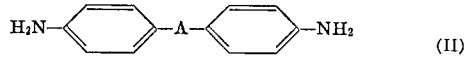
(II)

with coupling components having the general Formula III:

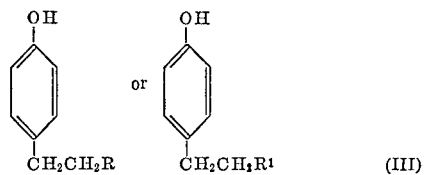
(III)

The following are specific examples of aromatic diamines having the Formula II:

4,4'-diaminodiphenylamine,
2,2-(4,4'-diaminodiphenyl)-propane,
1,1-(4,4'-diaminodiphenyl)-cyclohexane,
4,4'-diaminobenzophenone, benzidine,
4,4'-diaminodiphenyl ether,
4,4'-diaminodiphenyl sulfide,
4,4'-diaminodiphenyl sulfone,
4,4'-diaminodiphenylamine,
4,4'-diaminodiphenylurea,
N,N'-dimethyl-4,4'-diaminodiphenylurea,
N,N'-diethyl-4,4'-diaminodiphenylurea,
N-methyl-N'-ethyl-4,4'-diaminodiphenylurea,
N,N'-(4,4'-diaminodiphenyl)-ethylenurea,
N,N'-(4,4'-diaminodiphenyl)-propylenurea,
4,4'-diaminosulfanilide,
oxalic acid-bis (4-aminophenylamide),
succinic acid-bis (4-aminophenylamide),
adipic acid-bis (4-aminophenylamide),
pimelic acid-bis-(4-aminophenylamide),
suberic acid-bis-(4-aminophenylamide),
4,4'-diaminobenzanilide,
N-methyl-4,4'-diaminobenzanilide,
N-ethyl-4,4'-diaminobenzanilide,
N-(β-hydroxyethyl)-4,4'-diaminobenzanilide.

Compounds having the general Formula III include derivatives of β-(4'-hydroxyphenyl)-propionic acid which couple in ortho-position to the hydroxyl groups, for example β - (4' - hydroxyphenyl) - propionnitrile, β-(4'-hydroxyphenyl) - propionic acid, β - (4' - hydroxyphenyl)-propionic acid methyl, ethyl, propyl, butyl, iso- butyl, methylethylene glycol, and methylethylene diglycol esters, and β - (4' - hydroxyphenyl) - propionamide, -methylamide, -ethylamide, -butylamide, -dimethylamide and -diethylamide.

The compounds having the general Formula II can be tetrazotized in the conventional way, for example in dilute aqueous hydrochloric or sulfuric acid, with or without the addition of dispersing agents, in organic solvents such as glacial acetic acid, or in mixtures of water and organic solvents.

Coupling of the tetrazonium salts of the aromatic amines having the general Formula II with the coupling components having the general Formula III is advantageously carried out in aqueous alkaline solution with an addition of an acid-binding agent such as sodium hydroxide, sodium carbonate or sodium hydrogen carbonate.

The following examples illustrate the invention.

Unless otherwise stated, the parts and percentages in the following examples are by weight.

EXAMPLE 1

20 parts of 4.4'-diaminodiphenyl ether is stirred in a mixture of 600 parts of ice-water and 50 parts by volume of concentrated hydrochloric acid for one hour at 0° to 5° C. 60 parts by volume of a 23% solution of sodium nitrite is allowed to flow in slowly at the same temperature. Stirring is continued for another two hours and then any excess of nitrous acid present is removed by adding sulfamic acid. The diazo solution is then gradually introduced at 0 to 5° C., while adding 350 parts of ice, to a solution of 37 parts of methyl β-(4'-hydroxyphenyl)-propionate, 20 parts of 50% caustic soda solution and 30 parts of sodium carbonate in 600 parts of water. When coupling is over, the dye having the formula:

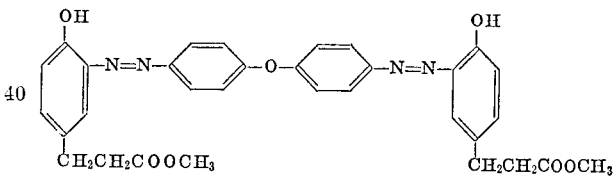

which has formed is suction filtered, washed with water and dried. It is a yellow brown powder which dissolves in dimethylformamide with a yellow color.

100 parts of polyethylene terephthalate fibers is dyed for sixty minutes at 125° C. in a pressure apparatus in a liquor containing 2,000 parts of water, 0.8 part of the finely divided dye and 2 parts of the sulfonated adduct of 80 moles of ethylene oxide to 1 mole of sperm oil alcohol. A pure yellow dyeing is obtained having excellent thermal resistance and outstanding fastness to light and wet treatments.

Other yellow dyes which give dyeing having similar properties on polyesters and polyamides may be prepared in the same way from the tetrazo components and coupling components in the following table.

| Example | Tetrazo component having Formula (II) | Coupling component having Formula (III) |
|---|---|---|
| 2 | ![structure with O linking two phenyl-NH2 groups] | OH phenyl-CH₂CH₂CN |
| 3 | Same as above | OH phenyl-CH₂CH₂COOC₂H₅ |

TABLE—Continued

| Example | Tetrazo component having Formula (II) | Coupling component having Formula (III) |
|---|---|---|
| 4 | ....do.... | OH–C₆H₄–CH₂CH₂COOC₃H₇(n) |
| 5 | ....do.... | OH–C₆H₄–CH₂CH₂COO(CH₂)ₙCH₃<br>Mixture of equal parts of compounds with n=zero, 1 and 2. |
| 6 | ....do.... | OH–C₆H₄–CH₂CH₂COOC₄H₉(n) |
| 7 | ....do.... | OH–C₆H₄–CH₂CH₂COOC₄H₉(i) |
| 8 | ....do.... | OH–C₆H₄–CH₂CH₂COOCH₂CH₂OCH₃ |
| 9 | ....do.... | OH–C₆H₄–CH₂–CH₂COOCH₂–CH(OCH₂CH₂OCH₃) (H₃CO–CH₂CH₂O–CH₂) |
| 10 | ....do.... | OH–C₆H₄–CH₂CH₂COOH |
| 11 | H₂N–C₆H₄–S–C₆H₄–NH₂ | OH–C₆H₄–CH₂CH₂CN |
| 12 | Same as above | OH–C₆H₄–CH₂CH₂COOCH₃ |

TABLE—Continued

| Example | Tetrazo component having Formula (II) | Coupling component having Formula (III) |
|---|---|---|
| 13 | ...do... |  OH — C₆H₄ — CH₂CH₂CONH(CH₂)₃OCH₃ |
| 14 | 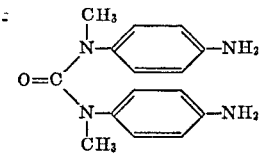 CH₃–N(C₆H₄–NH₂)–C(=O)–N(CH₃)–C₆H₄–NH₂ |  OH — C₆H₄ — CH₂CH₂CN |
| 15 | Same as above |  OH — C₆H₄ — CH₂CH₂COOCH₃ |
| 16 | ...do... |  OH — C₆H₄ — CH₂CH₂C(=O)NH₂ |
| 17 | ...do... | 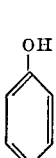 OH — C₆H₄ — CH₂CH₂COOH |
| 18 | 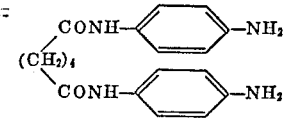 H₂N–C₆H₄–NHCO–(CH₂)₄–CONH–C₆H₄–NH₂ | 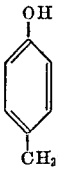 OH — C₆H₄ — CH₂CH₂CONH₂ |
| 19 | 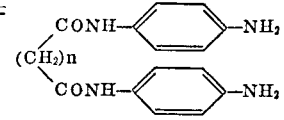 H₂N–C₆H₄–NHCO–(CH₂)ₙ–CONH–C₆H₄–NH₂  Mixtures of equal parts of compounds with n=4 and 6. |  OH — C₆H₄ — CH₂CH₂CN |
| 20 | Same as above |  OH — C₆H₄ — CH₂CH₂COOCH₃ |
| 21 | ...do... |  OH — C₆H₄ — CH₂CH₂COOH |
| 22 | 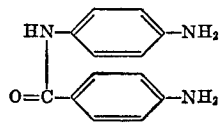 H₂N–C₆H₄–NH–C(=O)–C₆H₄–NH₂ | Same as above. |

TABLE—Continued
| Example | Tetrazo component having Formula (II) | Coupling component having Formula (III) |
|---|---|---|
| 23 | Same as above | 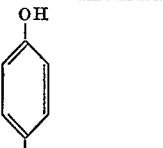 |
| 24 | 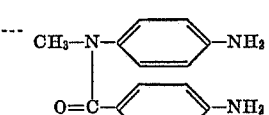 | 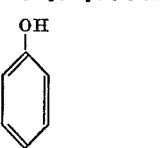 |
| 25 | Same as above | 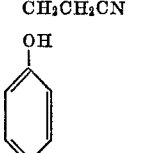 |
| 26 | 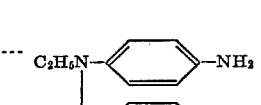 | 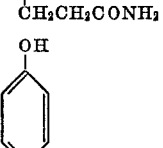 |
| 27 | 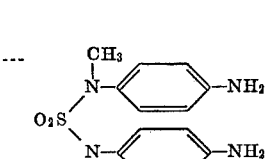 | 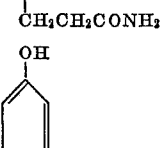 |
| 28 | 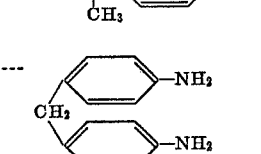 | 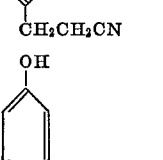 |
| 29 | Same as above | 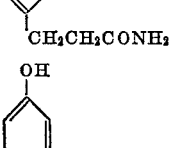 |
| 30 | 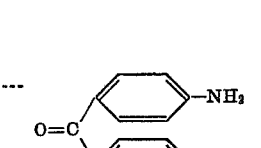 | 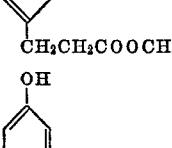 |
| 31 | 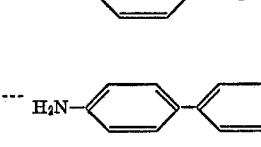 | 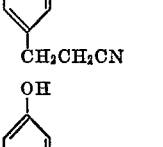 |
| 32 | Same as above | 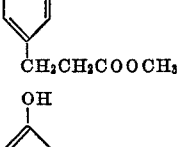 |

TABLE—Continued

| Example | Tetrazo component having Formula (II) | Coupling component having Formula (III) |
|---|---|---|
| 33 | H₂N—⟨C₆H₄⟩—CH(C₆H₅)—⟨C₆H₄⟩—NH₂ | 4-(CH₂CH₂CN)-phenol (OH para) |

EXAMPLE 34

24.2 parts of 4,4'-diaminodiphenylurea is stirred for several hours with 300 parts by volume of water and 0.3 part of the reaction product of oleylamine with about 12 moles of ethylene oxide at room temperature. 50 parts of concentrated hydrochloric acid and 300 parts of ice are added and at 0° to 5° C. 60 parts by volume of 23% sodium nitrite solution is allowed to flow in slowly. Stirring is continued at the same temperature for another two hours and then any excess of nitrous acid present is removed by adding sulfamic acid. The whole is then filtered and the diazo compound is coupled analogously to the method described in Example 1 to 34 parts of β-(4'-hydroxyphenyl)-propionamide. A yellow brown dye is formed having the formula:

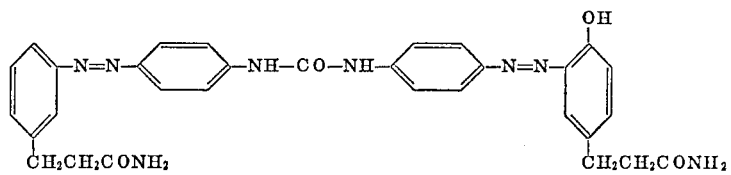

It dissolves in dimethylformamide with a deep yellow color.

100 parts of polyamide cloth is treated for ninety minutes at 95° to 100° C. in a liquor containing 1 part of this dye is finely divided form and 2 parts of sulfonated sperm oil alcohol in 2,000 parts of water to dye it. A pure yellow dyeing is obtained which has very good light and wet fastness properties.

Other yellow dyes having similar properties can be prepared in the same way from the tetrazo components and coupling components in the following table:

| Example | Tetrazo component having the Formula (II) | Coupling component having the Formula (III) |
|---|---|---|
| 35 | O=C(NH—C₆H₄—NH₂)(NH—C₆H₄—NH₂) | 4-[CH₂CH₂CONH(CH₂)₃OCH₃]-phenol (OH para) |
| 36 | Same as above | 4-(CH₂CH₂CN)-phenol (OH para) |
| 37 | do | 4-(CH₂CH₂COOCH₃)-phenol (OH para) |
| 38 | do | 4-(CH₂CH₂COOH)-phenol (OH para) |

I claim:
1. A disazo dye having the formula:

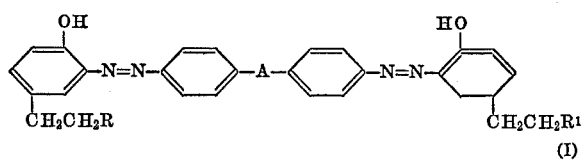

(I)

where R and R¹ may be identical or different and each is cyano, carboxyl, carbamoyl, carbalkoxy of 2 to 5 carbon atoms, N-mono or N,N-di-alkyl-substituted carbamoyl wherein the alkyl substituents have 1 to 4 carbon atoms, $-COOCH_2CH_2OCH_3$, $-CO(OCH_2CH_2)_2OCH_3$ or $-CONH(CH_2)_3OCH_3$ and
A is a direct bond, oxygen sulfur,

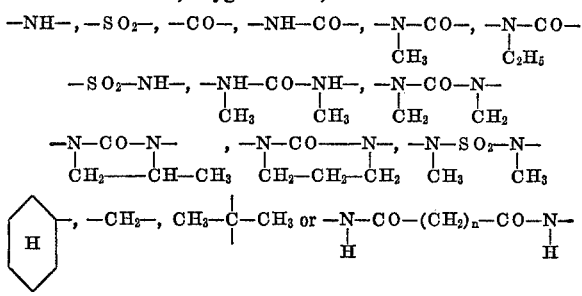

where $n$ denotes one of the integers 0 to 6.

2. A dye as claimed in claim 1 which has the formula:

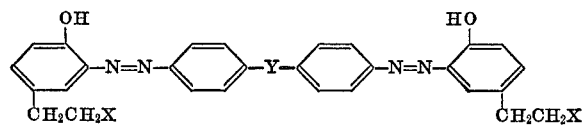

where X is cyano, carboxyl, carbamoyl or carboalkoxy of one to five carbon atoms,
Y is

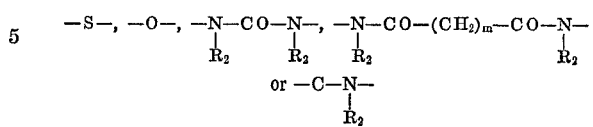

where $m$ is one of the integers from 0 to 6 and $R^2$ is hydrogen, methyl or ethyl.

3. A dye as claimed in claim 1 which has the formula:

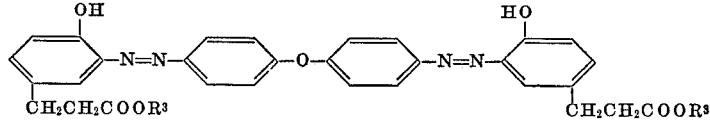

wher $R^3$ is alkyl of one to four carbon atoms, $-CHCH_2OCH_3$ or $-(OCH_2CH_2)_2-OCH_3$ 4. The dye having hte formula:

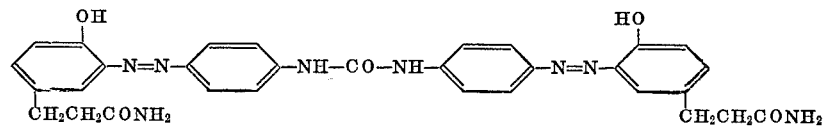

References Cited
UNITED STATES PATENTS

| | | | |
|---|---|---|---|
| 1,594,828 | 8/1926 | Geller | 260—175 |
| 2,032,133 | 2/1936 | Krebser | 260—178 |
| 2,273,094 | 2/1942 | Fischer et al. | 260—175 |
| 2,315,232 | 3/1943 | Thurm et al. | 260—178 |
| 2,726,238 | 12/1955 | Morschel et al. | 260—175 X |
| 2,777,840 | 1/1957 | Liechti et al. | 260—175 |
| 3,183,225 | 5/1965 | Dreyfuss | 260—175 X |
| 3,232,928 | 2/1966 | Baumann et al. | 260—175 |
| 3,421,829 | 1/1969 | Bennett et a. | 260—180 X |
| 3,578,654 | 5/1971 | Fayre | 260—186 |

FLOYD D. HIGEL, Primary Examiner

U.S. Cl. X.R.
260—154, 157, 178, 179, 186, 187

UNITED STATES PATENT OFFICE
CERTIFICATE OF CORRECTION

Patent No. 3,657,218          Dated April 18, 1972

Inventor(s) Gerhard Gnad

It is certified that error appears in the above-identified patent and that said Letters Patent are hereby corrected as shown below:

Column 1, line 27, that portion of the formula reading "|     R-CH$_2$-CH$_2$" should read -- |     R-CH$_2$-CH$_2$ --; line 39, those portions of the formula reading "CH$_2$ CH$_2$" should read -- CH$_3$ CH$_3$ --; line 41, that portion of the formula reading "CH$_2$ CH$_3$" should read -- CH$_2$——CH$_2$ --; line 41, that portion of the formula reading "CH$_2$——CH$_2$-CH$_3$" should read -- CH$_2$——CH-CH$_3$ --.

Column 3, line 44, "oxalic acid-bis (4-aminophenylamide)," should read -- oxalic acid-bis-(4-aminophenylamide), --; line 45, "succinic acid-bis (4-aminophenylamide)," should read -- succinic acid-bis-(4-aminophenylamide), --; line 46, "adipic acid-bis (4-aminophenylamide)," should read -- adipic acid-bis-(4-aminophenylamide), --.

Column 5, in the table, under "Example", after "6" and before "8", insert -- 7 --.

Column 11, in the table, Example 33, that portion of the formula reading "H" should read -- C --.
                                               C Column 12, line 34, "is" should read -- in --.

Column 13, line 30, claim 1, "oxygen sulfur," should read -- oxygen, sulfur, --; line 35, those portions of the formula reading "CH$_2$ CH$_2$" should read -- CH$_2$——CH$_2$ --; lines 38 to 41,

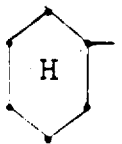 should read -- 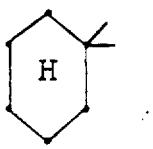 --.

Column 14, in the references, line 41, "Bennett et a." should read -- Bennett et al. --; line 42, "Fayre" should read -- Favre --.

Signed and sealed this 5th day of December 1972.

(SEAL)
Attest:

EDWARD M. FLETCHER, JR.            ROBERT GOTTSCHALK
Attesting Officer                     Commissioner of Patents